United States Patent
Scordilis et al.

(10) Patent No.: US 11,398,648 B2
(45) Date of Patent: Jul. 26, 2022

(54) SYSTEM FOR MANAGING AT LEAST ONE SUB-ASSEMBLY OF AN ELECTRIC BATTERY

(71) Applicant: EM Microelectronic-Marin SA, Marin (CH)

(72) Inventors: Thierry Scordilis, Cormondreche (CH); Jerome Saby, Colombier (CH); Arnaud Casagrande, Bole (CH); Luca De Rosa, Colombier (CH)

(73) Assignee: EM Microelectronic-Marin SA, Marin (CH)

( * ) Notice: Subject to any disclaimer, the term of this patent is extended or adjusted under 35 U.S.C. 154(b) by 325 days.

(21) Appl. No.: 16/580,405

(22) Filed: Sep. 24, 2019

(65) Prior Publication Data

US 2020/0099107 A1    Mar. 26, 2020

(30) Foreign Application Priority Data

Sep. 25, 2018 (EP) .................................... 18196555

(51) Int. Cl.
*H01M 10/42* (2006.01)
*H01M 10/44* (2006.01)

(52) U.S. Cl.
CPC ....... *H01M 10/425* (2013.01); *H01M 10/443* (2013.01); *H01M 2010/4271* (2013.01)

(58) Field of Classification Search
CPC .................... H01M 10/425; H01M 2010/4271
See application file for complete search history.

(56) References Cited

U.S. PATENT DOCUMENTS

| 6,184,656 B1 | 2/2001 | Karunasiri et al. |
| 9,970,993 B1 | 5/2018 | Mensah-Brown et al. |

(Continued)

FOREIGN PATENT DOCUMENTS

| CN | 103401747 A | * 11/2013 |
| DE | 10 2014 222 440 A1 | 5/2016 |

OTHER PUBLICATIONS

European Search Report dated Jan. 14, 2019 in European Application 18196555.9, filed on Sep. 25, 2018 (with English Translation of Categories of Cited Documents).

(Continued)

*Primary Examiner* — Jonathan G Jelsma
(74) *Attorney, Agent, or Firm* — Oblon, McClelland, Maier & Neustadt, L.L.P.

(57) ABSTRACT

The system (4) is provided for managing at least one sub-assembly (2) of an electric battery. Each sub-assembly comprises a plurality of power storage cells (12). The system includes, for each power storage cell, a circuit (14) for managing the state of the cell and a communication circuit (16), which is configured such that it receives and transmits data relative to the cell. The communication circuit is configured such that it transposes, over a carrier frequency, the data to be received and transmitted, the value of said carrier frequency being greater than or equal to 1 GHz. The management system further includes, for each sub-assembly, a loss cable (18) connecting the power storage cells of said sub-assembly. The loss cable acts as a waveguide and is coupled by capacitive coupling to the communication circuit of each power storage cell.

12 Claims, 2 Drawing Sheets

(56) References Cited

U.S. PATENT DOCUMENTS

2010/0295383 A1* 11/2010 Cummings ............... H02J 3/00
307/151
2015/0357685 A1* 12/2015 Iwasawa ............ G01R 31/3644
429/90

OTHER PUBLICATIONS

Christy, L, et al. "A New Class of Lightweight, Multifunctional Material for Electromagnetic Compatibility," 2017 IEEE International Symposium on Electromagnetic Compatibility & Signal/Power Integrity, 2017, pp. 11-16.

* cited by examiner

SYSTEM FOR MANAGING AT LEAST ONE SUB-ASSEMBLY OF AN ELECTRIC BATTERY

This application claims priority under 35 U.S.C. § 119 or 365 to European Application No. 18196555.9, filed Sep. 25, 2018. The entire contents of the above application(s) are incorporated herein by reference.

TECHNICAL FIELD OF THE INVENTION

The invention relates to a system for managing at least one sub-assembly of an electric battery.

The invention further relates to an electric battery comprising the management system and at least one sub-assembly provided with a plurality of power storage cells.

The electric battery is, for example, a battery intended to equip a vehicle, for example a motor vehicle, and in particular but not limited to an electric vehicle.

PRIOR ART

In order to be able to provide sufficient power levels, electric batteries are formed by sub-assemblies. Each of these sub-assemblies groups together a plurality of power storage cells. When using these batteries, several aspects must be checked such as, for example, maintaining an operational charge, optimal recharging and use and guaranteed battery integrity. These three aspects are intended to guarantee the service life of the battery by taking into account the temperature, the electric voltage state, the power reserve and the instantaneous power demand of the user, which takes place at each base cell of the battery.

Today, in order to carry out this check and this monitoring of cell management, the batteries often include connections which allow wired links to be made between sensors located at the cells, and data processing and management modules located at the sub-assemblies of the battery. The different management modules then communicate the data received to a concentrator. However, one drawback of such a system is that it involves a high number of wired connections which are difficult to create and expensive to produce. As a result of this construction, it is also difficult to maintain the integrity of the analogue or digital signals relative to sources of electromagnetic disturbance of signals, such as, for example, engines. Moreover, the number of wired connections is such that these connections result in a significant excess weight for the system, as well as complex assembly operations.

The measuring of all of these parameters at the battery cell is also known, followed by the transmission of this information using a data bus. The drawback in this case resides in the limited throughput that can be obtained with simple, low-consumption circuits.

If this transmission takes place by radiofrequency, radiated in a free field, as disclosed for example in the patent document U.S. Pat. No. 6,184,656 B1, this avoids the wired connections, however is nonetheless subjected to the problem of electromagnetic radiation, whether intentional or spurious. This is particularly problematic when the electric battery equips a vehicle. Electromagnetic compatibility issues can thus appear within the vehicle. Other drawbacks regarding the transmission by radiofrequencies include pure propagation issues between the cells of a given sub-assembly, and at the battery, as well as the design of antenna systems specific to each battery. The latter are, more specifically, very often formed by metal boxes made of iron, which behave from an electromagnetic perspective, as Faraday cages.

SUMMARY OF THE INVENTION

The invention thus aims to provide a system for managing at least one sub-assembly of an electric battery, allowing the number of wired connections comprised in the system to be reduced, while allowing real-time or near real-time cell management monitoring with a high throughput, and without using electromagnetic radiation in a free field, and overcoming the aforementioned drawbacks of the prior art.

For this purpose, the invention relates to a system for managing at least one sub-assembly of an electric battery, the one or each sub-assembly comprising a plurality of power storage cells, which comprises the features stipulated in the independent claim 1.

Specific embodiments of the management system are defined in the dependent claims 2 to 11.

One advantage of the present invention resides in the fact that each communication circuit associated with a power storage cell is configured such that it transposes, over a carrier frequency having a value that is greater than or equal to 1 GHz, the data to be received and to be transmitted, and in the fact that the management system includes, for the one or for each sub-assembly, a loss cable connecting the power storage cells of this sub-assembly. The loss cable is coupled by capacitive coupling to the communication circuit of each power storage cell. This prevents any galvanic contact between the communication circuits and the loss cable, and thus allows the number of wired connections comprised in the system to be reduced, moreover since there is only one loss cable per sub-assembly of the battery.

Furthermore, such a carrier frequency having a value of greater than or equal to 1 GHz allows very high transmission rates to be obtained, allowing for transmission or receipt of data in very little time, with a high communication frequency and a very high throughput. This allows for real-time or near real-time cell management monitoring with a very high throughput. Thanks to the management system according to the invention, approximately one hundred power storage cells of an electric battery, for example, can thus be monitored at a speed exceeding 1000 Hz, such a speed being 10 to 100 times greater than the speed required, with management systems of the prior art, to monitor the same number of power storage cells. This allows for the more comprehensive and optimal management of the electric battery, in particular the consumption thereof, in all phases of use of the battery.

Finally, another advantage of the system according to the invention is that it does not produce electromagnetic radiation inside the one or more sub-assemblies of the electric battery. This prevents the appearance of electromagnetic compatibility issues, and further prevents the need to design antenna systems specific to the battery. More specifically, in the present invention, the transmission or reception of data within each sub-assembly of the electric battery takes place via a capacitive coupling, in guided radio wave propagation mode, and not via radiofrequency radiation in a free field. Such a propagation mode by guided radio waves further guards against sources of electromagnetic disturbance, such as engines for example.

Advantageously, the value of the carrier frequency is substantially equal to 5.7 GHz. This value of 5.7 GHz allows a significant bandwidth to be obtained, allowing the transmission rate and the real-time or near real-time management monitoring to be optimised, while retaining simple and inexpensive electronic circuits. In particular, this carrier frequency value of 5.7 GHz allows for very high throughputs of about several tens of megabits per second. However, this carrier frequency can also be 2.45 GHz.

According to one specific technical feature of the invention, the management system further includes, for each power storage cell, capacitive coupling means electrically connected to the communication circuit of the cell, and the loss cable is coupled to the communication circuit of each power storage cell via the capacitive coupling means.

According to a first embodiment of the invention, the loss cable is formed by a twisted pair comprising two strands.

According to a second embodiment of the invention, the loss cable has a coaxial form.

Advantageously, the capacitive coupling means can be formed by a cable pass ring, the ring comprising, on the inner surface thereof, a metal coating, the loss cable being inserted into the ring of each power storage cell. This allows the loss cable of each sub-assembly to be very easily coupled to the communication circuits of the power storage cells of this sub-assembly. More specifically, no electrical wired connection is required and the loss cable must simply be inserted into the rings of the power storage cells predisposed for this purpose.

Advantageously, the management circuit and the communication circuit of each power storage cell are electrically powered by said power storage cell. This allows, for each power storage cell of the electric battery, to separate the management and communication circuits from the power circuit of the battery. Thus, the management and communication circuits are not powered via the power circuit of the electrical battery, which preserves the electrical power contained therein in order to perform the usual functions associated with the power circuit.

For this purpose, the invention further relates to an electric battery comprising at least one sub-assembly provided with a plurality of power storage cells, and a system for managing the one or more sub-assemblies described hereinabove, and which comprises the features stipulated in the independent claim 12.

Specific embodiments of the electric battery are defined in the dependent claims 13 and 14.

According to one specific technical feature of the invention, the electric battery further comprises a central member for concentrating and processing data, and, for the one or for each sub-assembly, a module for managing the state of the sub-assembly and a communication module, the communication module of the one or of each sub-assembly being coupled firstly to the loss cable of said sub-assembly and connected secondly to the central data concentration and processing member.

Advantageously, the central data concentration and processing member comprises a computing unit configured so as to dynamically modify the boundary between the upstream communication of data originating from the power storage cells, and the downstream communication of data to the power storage cells. This allows the data transmission and reception levels to be dynamically adapted in order to facilitate the high-speed data transmission and ensure that the reception of data is pleasant for a receiver. For the purposes of illustration, with a throughput of 26 megabits per second, 64 bytes can be transmitted or received by dynamically modifying the boundary between transmission and reception.

BRIEF DESCRIPTION OF THE FIGURES

The purposes, advantages and features of the management system according to the invention, as well as of the electric battery comprised therein, will appear more clearly in the following description which is given on the basis of at least one non-limiting embodiment shown by way of the drawings, in which.

DETAILED DESCRIPTION OF THE INVENTION

Figure 1:
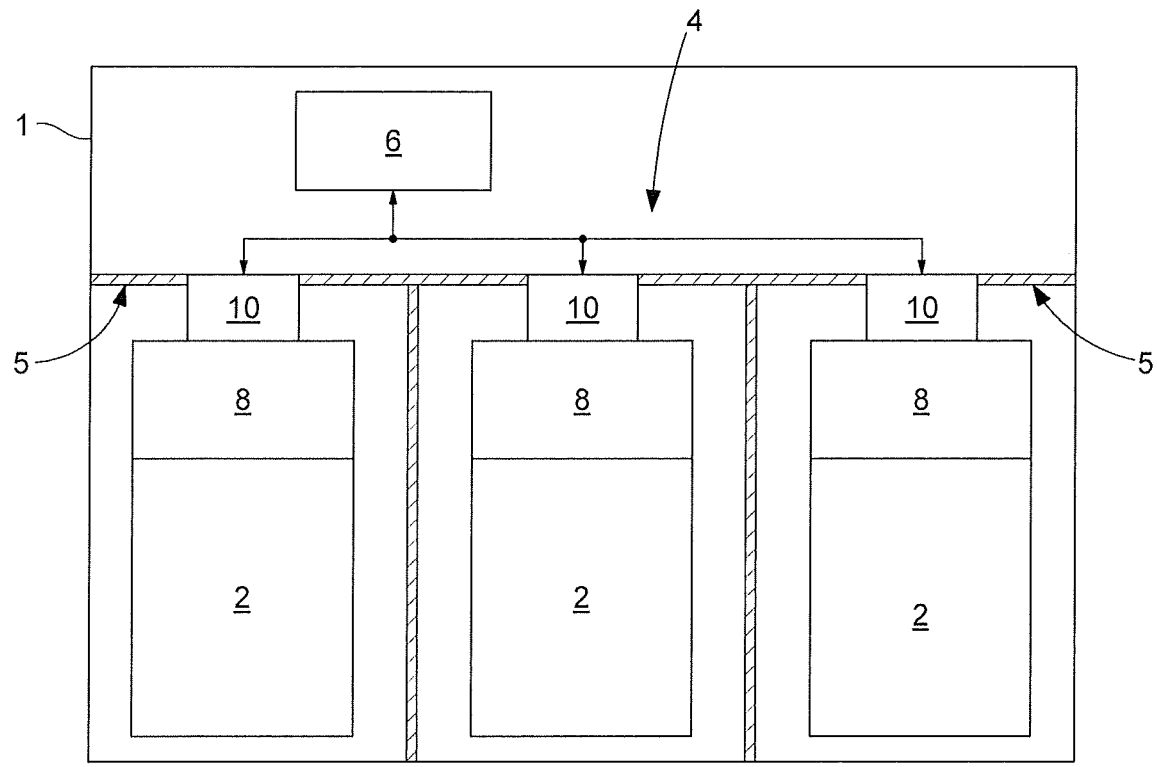
FIG. 1 is a diagrammatic view of an electric battery comprising three sub-assemblies, and a system for managing the three sub-assemblies.

FIG. 1 shows an electric battery 1, which comprises a plurality of sub-assemblies 2 and a system 4 for managing the sub-assemblies 2. The sub-assemblies 2 are, for example, disposed in compartments 5 of the electric battery 1. Such compartments 5, for example each whereof is formed by a casing provided with metal walls, allowing the sub-assemblies 2 to be separated. This compartmentalisation of the electric battery 1 is particularly useful in the case where the electric battery 1 equips a vehicle of the electric car type. More specifically, it thus overcomes the problem of mechanical assembly in the floor of such a car. In the example shown in FIG. 1, the electric battery 1 comprises three sub-assemblies 2. In the case where the electric battery 1 equips a vehicle of the electric car type, the battery 1 can include about twenty sub-assemblies 2. Preferably, the electric battery 1 further comprises a central data concentration and processing member 6 and, for each sub-assembly 2, a module 8 for managing the state of the sub-assembly 2 and a communication module 10. Thus, in the example shown in FIG. 1, the electric battery 1 comprises three management modules 8 and three communication modules 10.

Each sub-assembly 2 of the electric battery 1 comprises a plurality of power storage cells 12. In the example embodiment in FIG. 2, each sub-assembly 2 comprises a number n of power storage cells 12. In the case where the electric battery 1 equips a vehicle of the electric car type, each sub-assembly 2 of the battery 1 can include about thirty power storage cells 12.

Figure 2:
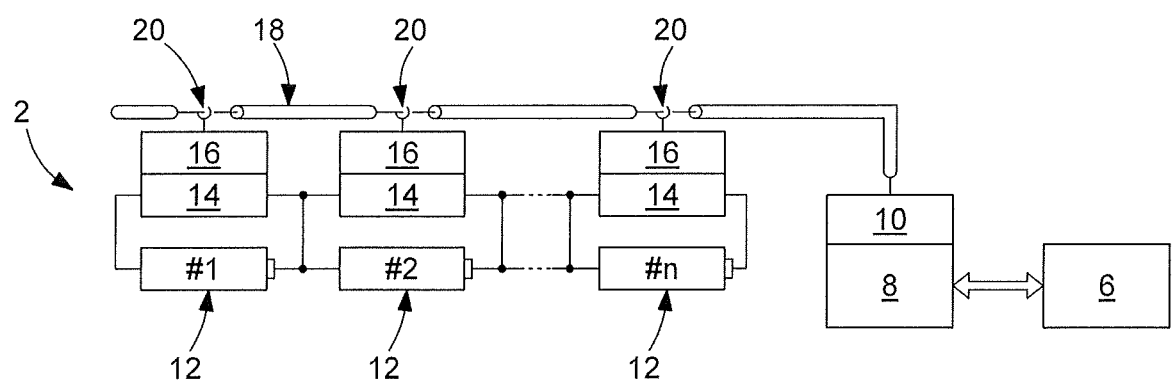
FIG. 2 is a diagrammatic view of a part of the management system in FIG. 1, associated with one of the sub-assemblies of the electric battery, and comprising a loss cable.

As shown in FIG. 2, the power storage cells 12 within the same sub-assembly 2 are connected to one another, typically in series. Each power storage cell 12 forms an electrochemical unit cell, the set of cells 12 allowing power to be stored inside the battery 1.

As shown in FIG. 2, the system 4 for managing the sub-assemblies 2 includes, for each power storage cell 12, a circuit 14 for managing the state of the cell 12 and a communication circuit 16. The management system 4 further includes, for each sub-assembly 2, a loss cable 18 connecting the power storage cells 12 of this sub-assembly 2. Preferably, the management system 4 further includes, for each power storage cell 12, capacitive coupling means 20 electrically connected to the communication circuit 16 of the cell 12.

The circuit 14 for managing the state of a power storage cell 12 is configured such that it monitors the state of the cell 12, such as for example the state of charge, the consumption, the temperature and/or the voltage level of the cell 12. For this purpose, the management circuit 14 includes, for example, a plurality of dedicated electronic sensors. The circuit 14 for managing the state of a cell 12 includes two terminals, each of the terminals being connected to one respective terminal of the cell 12. Thus, each management circuit 14 is connected in parallel with the cell 12 monitored thereby. As shown in FIG. 2, the management circuits 14 within the same sub-assembly 2 are also connected to one another, typically in series.

The communication circuit 16 of a power storage cell 12 is configured such that it receives and transmits data relative to the cell 12. The data to be transmitted are, for example, measurement data on the state of charge of the cell 12, the power consumption thereof, the temperature thereof and/or the voltage level at the terminals thereof. The data to be received are, for example, requests to measure these different parameters. The communication circuit 16 of each cell 12 is further configured such that it transposes, over a carrier frequency having a value that is greater than or equal to 1 GHz, the data to be received and transmitted. The communication circuit 16 is, for example, configured so as to carry out such a transposition of data via an amplitude modulation and/or via a frequency modulation. Preferably, the value of the carrier frequency is substantially equal to 5.7 GHz. However, this carrier frequency can also be 2.45 GHz.

For each power storage cell 12, the circuit 14 for managing the state of the cell and the communication circuit 16 are, for example, each integrated onto a dedicated printed circuit board. In such a case, the two printed circuit boards are electrically connected to one another. Alternatively, the circuit 14 for managing the state of the cell and the communication circuit 16 can share the same printed circuit board.

Preferably, for each power storage cell 12, the circuit 14 for managing the state of the cell and the communication circuit 16 are electrically powered by the power storage cell itself. These two circuits 14, 16 are thus completely separate from the power circuit of the electric battery 1, and are directly powered by the power storage cell 12 with which they are associated.

Figure 3:
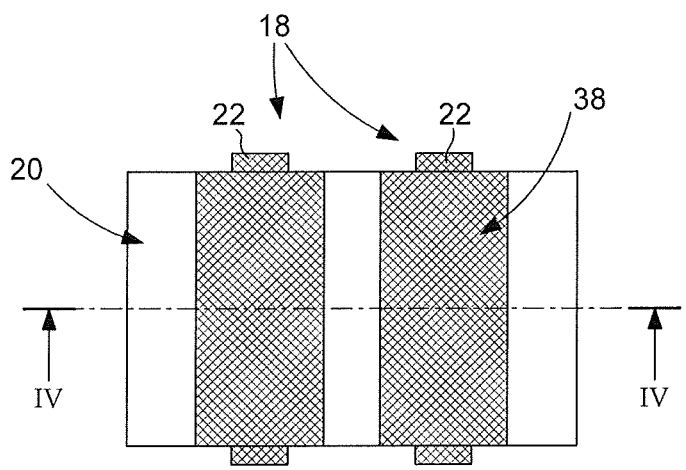
FIG. 3 is a view from below of one example embodiment of the capacitive coupling means coupling the loss cable in FIG. 2, according to a first alternative embodiment, to communication circuits associated with the power storage cells.
Figure 4:
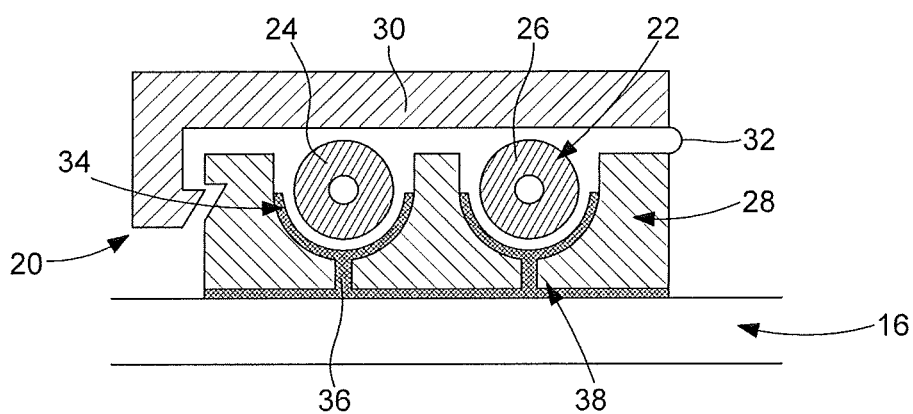
FIG. 4 is a sectional view, taken according to a cutting plane IV-IV, of the capacitive coupling means in FIG. 3.

Each loss cable 18 acts as a waveguide and is coupled, by capacitive coupling, to the communication circuit 16 of each power storage cell 12 of the sub-assembly 2 with which it is associated. Capacitive coupling takes place, for example, by way of the capacitive coupling means 20, as shown in FIGS. 2 to 4.

Referring back to FIGS. 1 and 2, the communication module 10 of each sub-assembly 2 is coupled firstly to the loss cable 18 of this sub-assembly 2 and secondly to the central data concentration and processing member 6. The communication module 10 of each sub-assembly forms an intermediate node allowing data relative to the cells 12 of this sub-assembly to transit from the central member 6 to the cells 12, and vice-versa. The communication module 10 of each sub-assembly 2 is coupled to a module 8 for managing the state of this sub-assembly 2. Each management module 8 is configured such that it manages the state of the cells 12 of the sub-assembly 2 with which it is associated such as, for example, the state of charge, the consumption, the temperature and/or the voltage level of the cells 12.

Preferably, the central data concentration and processing member 6 comprises a computing unit configured so as to dynamically modify the boundary between the upstream communication of data originating from the power storage cells 12, and the downstream communication of data to the power storage cells 12.

A first embodiment of the invention will now be described with reference to FIGS. 3 and 4. According to this first embodiment, the loss cable 18 is formed by a twisted pair comprising two strands 22. As shown in FIG. 4, each strand 22 is formed by a core 24 and an insulating sheath 26 surrounding the core 24. FIG. 3 shows the communication circuit 16 of a power storage cell 12, the loss cable 18 in the form of a twisted pair, and the capacitive coupling means 20 according to this first embodiment. According to the example embodiment shown in FIG. 3, the loss cable 18 is arranged above the communication circuit 16, and the means 20 couple the loss cable 18 to the communication circuit 16 by capacitive coupling.

According to this first embodiment, the capacitive coupling means 20 are formed by a part for separating the strands 22. The separating part 20 is inserted between, on the one hand, the two strands 22 of the twisted pair 18 and on the other hand the communication circuit 16 of the power storage cell 12. More specifically, as shown in FIG. 4, the separating part 20 comprises a plastic base 28 on which a movable cover 30 is mounted. The movable cover 30 is, for example, mounted on the plastic base 28 via a hinge-forming means 32. The plastic base 28 defines two semi-cylindrical longitudinal cavities 34, the longitudinal direction being considered to be the direction in which the loss cable 18 extends. Inside each semi-cylindrical cavity 34, substantially in the centre of the cavity 34 and over the entire length of the base 28, a longitudinal groove 36 is made, passing through the thickness of the base 28 and opening externally thereto. The part 20 further comprises a metal coating 38, the metal coating 38 extending in a continuous manner on the bottom of each semi-cylindrical cavity 34, inside the longitudinal grooves 36, and on the outside of the base 28 in order to form a conductive track on an external face of the base 28.

In the position of use of the separating part 20, the base 28 is disposed on the communication circuit 16 of the power storage cell 12, the face of the base 28 on which the metal coating 38 extends being in contact with the circuit 16. The two strands 22 of the twisted pair 18 each extend in a corresponding semi-cylindrical cavity 34. The movable cover 30 is in the closed position and closes over the strands 22. The data signal is present on the metal coating 38, and the separating part 20 allows the twisted pair 18 to be coupled, by capacitive coupling, to the communication circuit 16.

Figure 5:
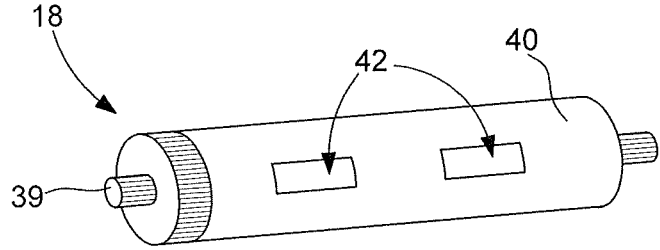
FIG. 5 is a perspective view of the loss cable in FIG. 2, according to a second alternative embodiment.

A second embodiment of the invention will now be described with reference to FIG. 5. According to this second embodiment, the loss cable 18 has a coaxial form. The loss cable 18 comprises a core 39, an external shield 40 surrounding the core 39, and a plurality of slots 42 made in the external shield 40. In the example embodiment shown in FIG. 5, the slots 42 are longitudinal slots, the longitudinal direction being considered to be the direction in which the loss cable 18 extends. The slots 42 are made in the ground plane of the external shield 40, thus making the cable 18 a loss cable.

As shown in FIG. 2, according to this second embodiment, the capacitive coupling means 20 are formed by a cable pass ring 18. The ring comprises, on the inner surface thereof, a metal coating, and the loss cable 18 is inserted into the ring 20 of each power storage cell 12. The metal coating of the ring 20 is, for example, connected to the communication circuit 16 of the cell 12 via a microstrip electric line. Such an electric line acts as a guide to an electromagnetic wave propagation, and is formed by a conductive strip deposited on a dielectric substrate, the second metallised face whereof acts as a ground plane. The data signal is thus present on the metal coating of the ring 20, and the ring 20 allows the coaxial cable 18 to be coupled, by capacitive coupling, to the communication circuit 16.

Although not shown, the coaxial cable could be considered to be bonded to the battery and capacitive coupling takes place between the battery elements, i.e. between the loss cable and a microstrip on the electronic module.

Figure 6:
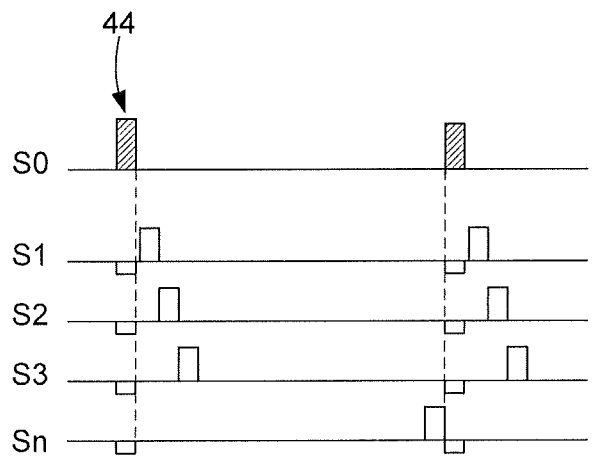
FIG. 6 is a timing chart showing one example of a data transfer between power storage cells of the sub-assembly of the electric battery in FIG. 2 and a module for managing the state of the sub-assembly.

FIG. 6 is a timing chart showing a synchronised data transfer protocol within one of the sub-assemblies 2 of the electric battery 1, according to one example embodiment. This figure shows different data transfer initiation signals. A first signal $S_0$ corresponds to a clock signal, indicating a start time 44 allowing the synchronised data transfer protocol to be initiated. The first signal $S_0$ is emitted at the module 8 for managing the state of the sub-assembly 2, then is transmitted to the different circuits 14 for managing the state of the cells 12, via the communication module 10, the loss cable 18, the capacitive coupling means 20 and the communication circuits 16. After reception of this first signal $S_0$, the different management circuits 14 sequentially transmit, to the management module 8, the data relative to the cells 12 of the sub-assembly 2. Thus, each management circuit 14, corresponding to a power storage cell 12, emits a respective signal $S_1, S_2, S_3, \ldots S_n$ transporting data relative to the state of the cell 12. The different signals $S_1, S_2, S_3, \ldots S_n$ are emitted sequentially and regularly to the management module 8, after reception of the first signal $S_0$ by all of the management circuits 14. The module 8 for managing the sub-assembly 2 then transmits the data received to the concentrating member 6. Such a synchronised protocol allows the transfer of information between the power storage cells 12 and the concentrating member 6 to be optimised.

The invention claimed is:

1. A system for managing at least one sub-assembly of an electric battery, the one or each sub-assembly comprising:
   a plurality of power storage cells,
   wherein the system further comprises, for each power storage cell, a circuit for managing a state of the cell and a communication circuit, the communication circuit being configured to receive and transmit data relative to the cell,
   wherein the communication circuit is configured to transpose, over a carrier frequency, the data to be received and to be transmitted, the value of said carrier frequency being greater than or equal to 1 GHz,
   wherein the system further comprises, for the one or for each sub-assembly, a loss cable connecting the power storage cells of said sub-assembly, said loss cable acting as a waveguide and being coupled by capacitive coupling to the communication circuit of each power storage cell,
   wherein the loss cable is formed by a twisted pair comprising two strands, and
   wherein the capacitive coupling is formed by a part for separating the strands, said part being inserted between, on one hand, the two strands of the twisted pair and on the other hand the communication circuit of the power storage cell.

2. The system according to claim 1, wherein the value of the carrier frequency is substantially equal to 5.7 GHz.

3. The system according to claim 1, wherein the system further comprises, for each power storage cell, capacitive coupling means electrically connected to the communication circuit of the cell, and
   wherein the loss cable is coupled to the communication circuit of each power storage cell via the capacitive coupling means.

4. The system according to claim 1, wherein the separating part comprises a metal coating and a plastic base, said plastic base defining two semi-cylindrical longitudinal cavities and two longitudinal through-grooves, each longitudinal through-groove extending substantially in the center of one of the cavities over the entire length of the base, the metal coating extending in a continuous manner on the bottom of each semi-cylindrical cavity, inside the longitudinal grooves, and on the outside of the base in order to form a conductive track on an external face of the base, the two strands of the twisted pair each extending in one of the semi-cylindrical cavities.

5. The system according to claim 1, wherein the loss cable has a coaxial form.

6. The system according to claim 5, wherein the loss cable comprises a plurality of slots made in an external shield of the cable.

7. The system according to claim 5, wherein the capacitive coupling is further formed by a cable pass ring, the ring comprising, on the inner surface thereof, a metal coating, the loss cable being inserted into the ring of each power storage cell.

8. The system according to claim 1, wherein the communication circuit of each power storage cell is configured such that it transposes, by amplitude modulation and/or frequency modulation, over the carrier frequency, the data to be received and transmitted.

9. The system according to claim 1, wherein the management circuit and the communication circuit of each power storage cell are electrically powered by said power storage cell.

10. An electric battery comprising
    at least one sub-assembly and a system for managing the one or more sub-assemblies, the one or each sub-assembly including a plurality of power storage cells, wherein the management system is as claimed in claim 1.

11. The electric battery according to claim 10, further comprising a central member for concentrating and processing data, and, for the at least one sub-assembly or for each sub-assembly, a module for managing the state of the sub-assembly and a communication module, the communication module of the at least one sub-assembly or of each sub-assembly being coupled firstly to the loss cable of said sub-assembly and connected secondly to the central data concentration and processing member.

12. The electric battery according to claim 11, wherein the central data concentration and processing member comprises a computing unit configured to dynamically modify the boundary between the upstream communication of data originating from the power storage cells, and the downstream communication of data to the power storage cells.

* * * * *